US006651437B2

(12) United States Patent
Farmer et al.

(10) Patent No.: US 6,651,437 B2
(45) Date of Patent: Nov. 25, 2003

(54) COMBUSTOR LINER AND METHOD FOR MAKING THEREOF

(75) Inventors: Gilbert Farmer, Cincinnati, OH (US); James A. Groeschen, Burlington, KY (US); Ronald D. Redden, Foster, KY (US); Shaun M. DeVane, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/028,028

(22) Filed: Dec. 21, 2001

(65) Prior Publication Data

US 2003/0115886 A1 Jun. 26, 2003

(51) Int. Cl.[7] ............................... F23R 3/06; F23R 3/50
(52) U.S. Cl. ........................................ 60/752; 60/757
(58) Field of Search ............................ 60/752, 753, 754, 60/755, 756, 757, 758, 759, 760, 39.37, 798, 800, 746, 747

(56) References Cited

U.S. PATENT DOCUMENTS

| | | | | |
|---|---|---|---|---|
| 2,702,987 A | * | 3/1955 | Nicolin | 60/799 |
| 4,149,373 A | * | 4/1979 | Jones et al. | 60/800 |
| 4,296,606 A | * | 10/1981 | Reider | 60/754 |
| 4,358,658 A | | 11/1982 | Van Blarigan et al. | |
| 4,458,481 A | * | 7/1984 | Ernst | 60/39.511 |
| 4,485,630 A | * | 12/1984 | Kenworthy | 60/757 |
| 4,787,209 A | * | 11/1988 | Taylor et al. | 60/757 |
| 4,821,387 A | * | 4/1989 | Bouillot et al. | 60/757 |
| 5,086,968 A | * | 2/1992 | Fawley et al. | 228/119 |
| 5,168,142 A | | 12/1992 | Gartner et al. | |
| 5,209,067 A | * | 5/1993 | Barbier et al. | 60/757 |
| 6,032,361 A | | 3/2000 | Makino et al. | |
| 6,054,672 A | | 4/2000 | Foster et al. | |
| 6,112,642 A | | 9/2000 | Jarrett et al. | |

FOREIGN PATENT DOCUMENTS

JP 408200681 A * 8/1996

* cited by examiner

*Primary Examiner*—Ted Kim
(74) *Attorney, Agent, or Firm*—David L. Narciso; Pierce Atwood

(57) ABSTRACT

A combustor liner is provided having first and second annular bands which define an overlapping circumferential joint area, wherein a weld is disposed in the joint area encompassing substantially all of the axial length of the joint area. A method for producing such a combustor liner is also provided.

5 Claims, 5 Drawing Sheets

COMBUSTOR LINER AND METHOD FOR MAKING THEREOF

This invention relates generally to combustor liners for gas turbine engines and more particularly to liners which are assembled from a plurality of annular bands.

A gas turbine engine includes a compressor that provides pressurized air to a combustor wherein the air is mixed with fuel and ignited for generating hot combustion gases. These gases flow downstream to one or more turbines that extract energy therefrom to power the compressor and provide useful work such as powering an aircraft in flight. Combustor used in aircraft engines typically include inner and outer combustor liners to protect the combustor case and surrounding engine components from the intense heat generated by the combustion process.

One particular type of combustor liner is comprised of a plurality of annular sheet metal bands that are joined together at overlapping circumferential joints to form an assembled liner. Prior art inner and outer liners of this type are presently constructed by brazing the sheet metal bands together at the overlapping joints. The process involves tack welding the bands in place, followed by manually applying a braze filler at each braze joint, followed by a furnace cycle braze operation. The braze joints are then inspected, for example by x-raying the joints. A large proportion of liners joined in this manner, in some instances over 90%, exhibit defects such as voids in the braze joints, which require a second braze operation involving the application of more slurry in the areas which have braze voids and a subsequent second furnace cycle and additional x-ray inspection. Brazing of the liners is costly and increases the manufacturing cycle time needed to produce the liners.

Accordingly, there is a need for combustor liners having a lower cost and simplified manufacturing process.

BRIEF SUMMARY OF THE INVENTION

The above-mentioned need is met by the present invention, which provides a combustor liner having first and second annular bands which have an overlapping circumferential joint area. A weld is disposed in the joint area and encompasses substantially all of the axial length of the joint area. The invention also provides a method for producing such a combustor liner.

The present invention and its advantages over the prior art will become apparent upon reading the following detailed description and the appended claims with reference to the accompanying drawings.

BRIEF DESCRIPTION OF THE DRAWINGS

The subject matter that is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
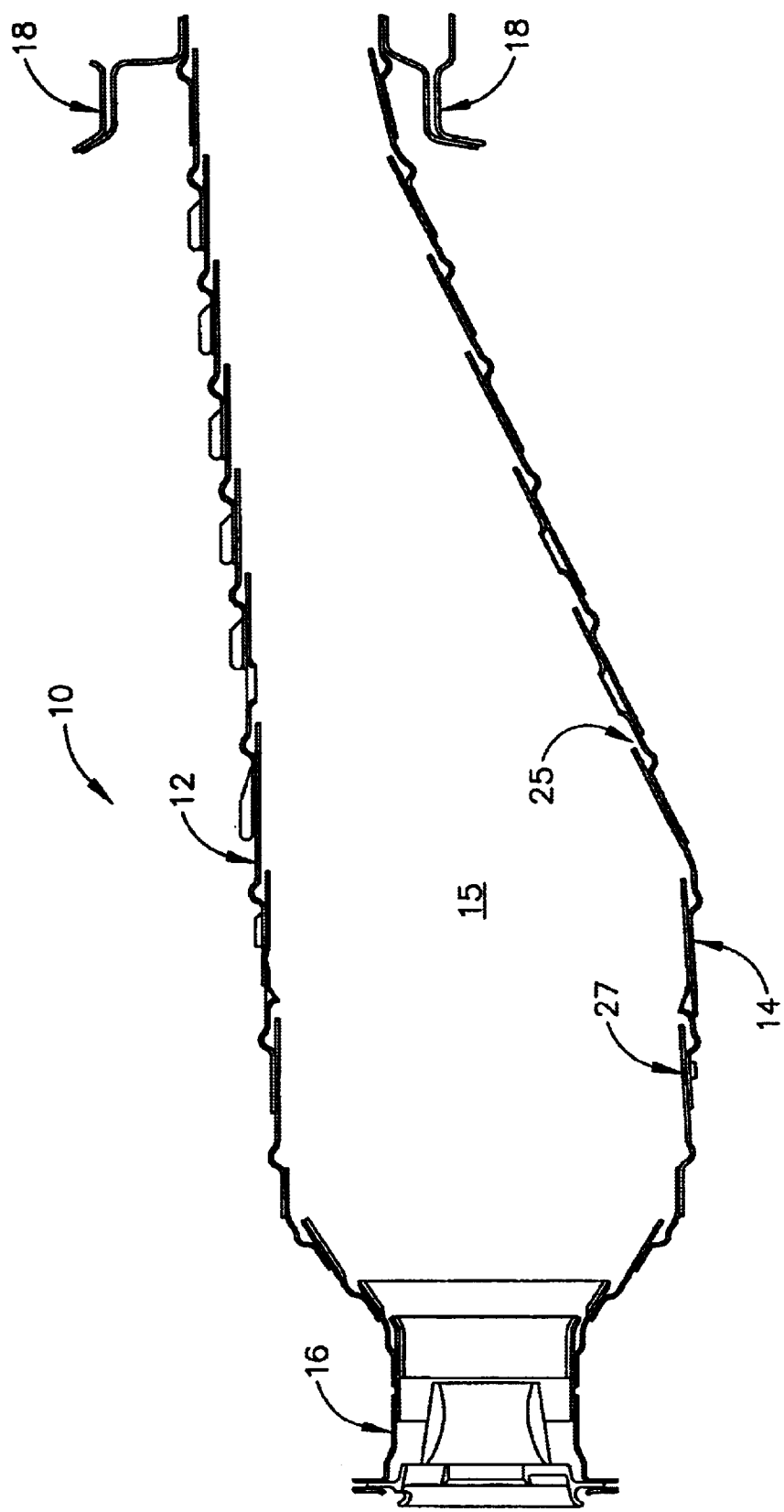
FIG. 1 is a cross-sectional view of a combustor assembly.

Referring to the drawings wherein identical reference numerals denote the same elements throughout the various views, FIG. 1 illustrates an exemplary combustor 10. The illustrated combustor 10 is of annular design which has a central axis 11 (shown in FIG. 5) coincident with the longitudinal axis of a gas turbine engine (not shown) when assembled, although the present invention is equally applicable to other types of combustors having liners disposed about an axis. The combustor 10 has circumferentially extending outer and inner liners 12 and 14, which define an annular combustion chamber 15. the liners 12 and 14 are connected at their forward ends by an annular dome assembly 16. Each liner has a mounting flange 18 attached to its aft end. Film cooling of the liners 12 and 14 is provided by a plurality of cooling slots 25, which are described in more detail below.

Figure 2:
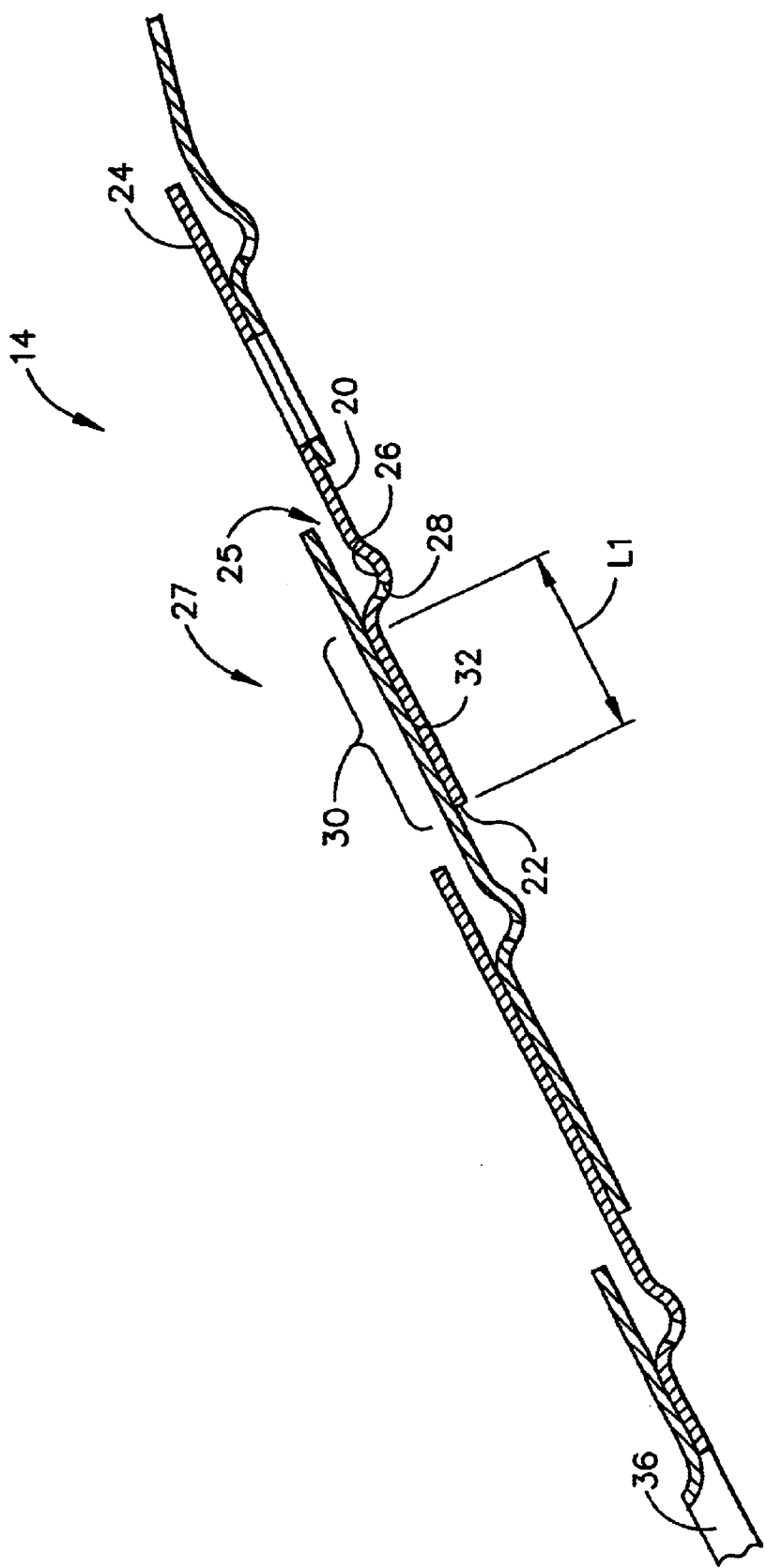
FIG. 2 is an enlarged cross-sectional view of a prior art combustor liner band joint.

Referring now to FIG. 2, an inner liner 14 constructed in accordance with the prior art is illustrated. It should be noted that the following descriptions are equally applicable to an outer liner 12. The inner liner 14 is built up from a plurality of bands 20, each of which has a forward end 22 and an aft end 24. The bands are typically formed of a high-temperature oxidation resistant alloy such as HASTELLOY alloy X. Each band 20 is connected to the axially adjacent bands 20 by a brazed joint 27. The bands 20 have a ridge 26 formed therein which contains a plurality of cooling holes 28. When the inner liner 14 is assembled, the ridges 26 and the aft end 24 of the adjacent band 20 cooperate to form a cooling slot 25. A braze joint area 30 extends around the circumference of the band 20 and is delimited in the axial direction by the overlap of the adjacent bands 20. The portion of the band 20 extending past ridge 26 has an axial length L1 that is equal to the axial length of the joint area 30, which in the illustrated embodiment is about 2.54 cm (1 in.). The prior art inner liner 14 is typically constructed by brazing the sheet metal bands 20 together. Initially, the bands 20 are temporarily held together by a plurality of tack welds (not shown). Then a slurry of a suitable braze material 32 is applied to the joint areas 30. The inner liner 14 is then placed in a furnace and subjected to a braze operation, which involves heating the inner liner 14 to a temperature above the melting point of the braze material 32 but below that of the band 20. this causes the braze material to melt and flow in the braze joint area 30. Upon cooling the braze material solidifies, joining bands 20 to each other. Unfortunately, the brazing process is not perfect, causing some of the joints 27 to have voids wherein no braze material is present. This is unacceptable for structural and heat transfer reasons. Therefore, after the braze cycle is complete the joints 27 are inspected for defects, for example by x-raying the joints 27. A large proportion of the inner liners 14, in some instances over 90%, require a second braze operation which involves the application of more slurry in the areas which have braze voids and a subsequent second furnace braze cycle. This rework of the inner liners 14 is costly and increases the production cycle time needed to manufacture the inner liners 14.

Figure 3:
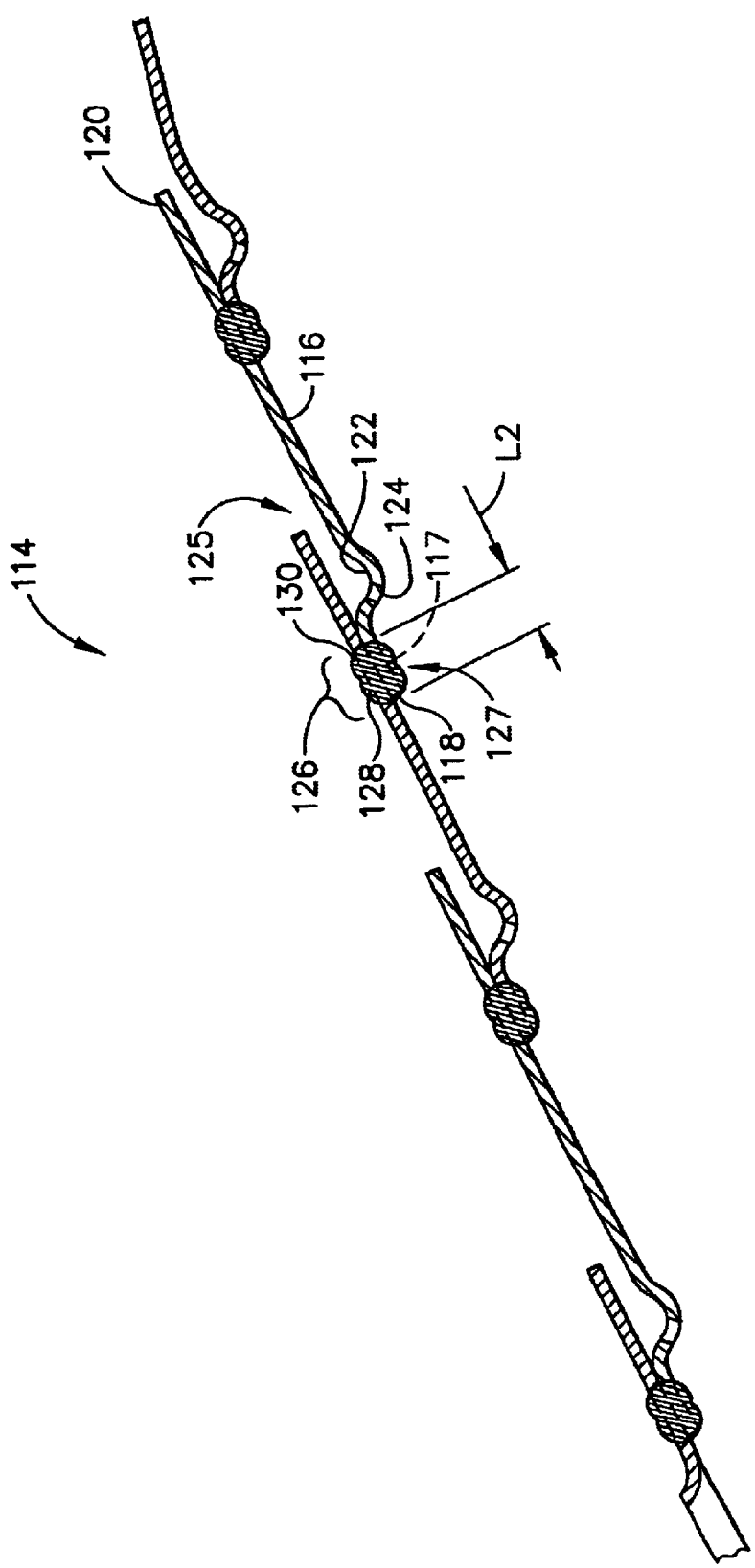
FIG. 3 is an enlarged cross-sectional view of a combustor liner band joint constructed in accordance with the present invention.
Figure 4:
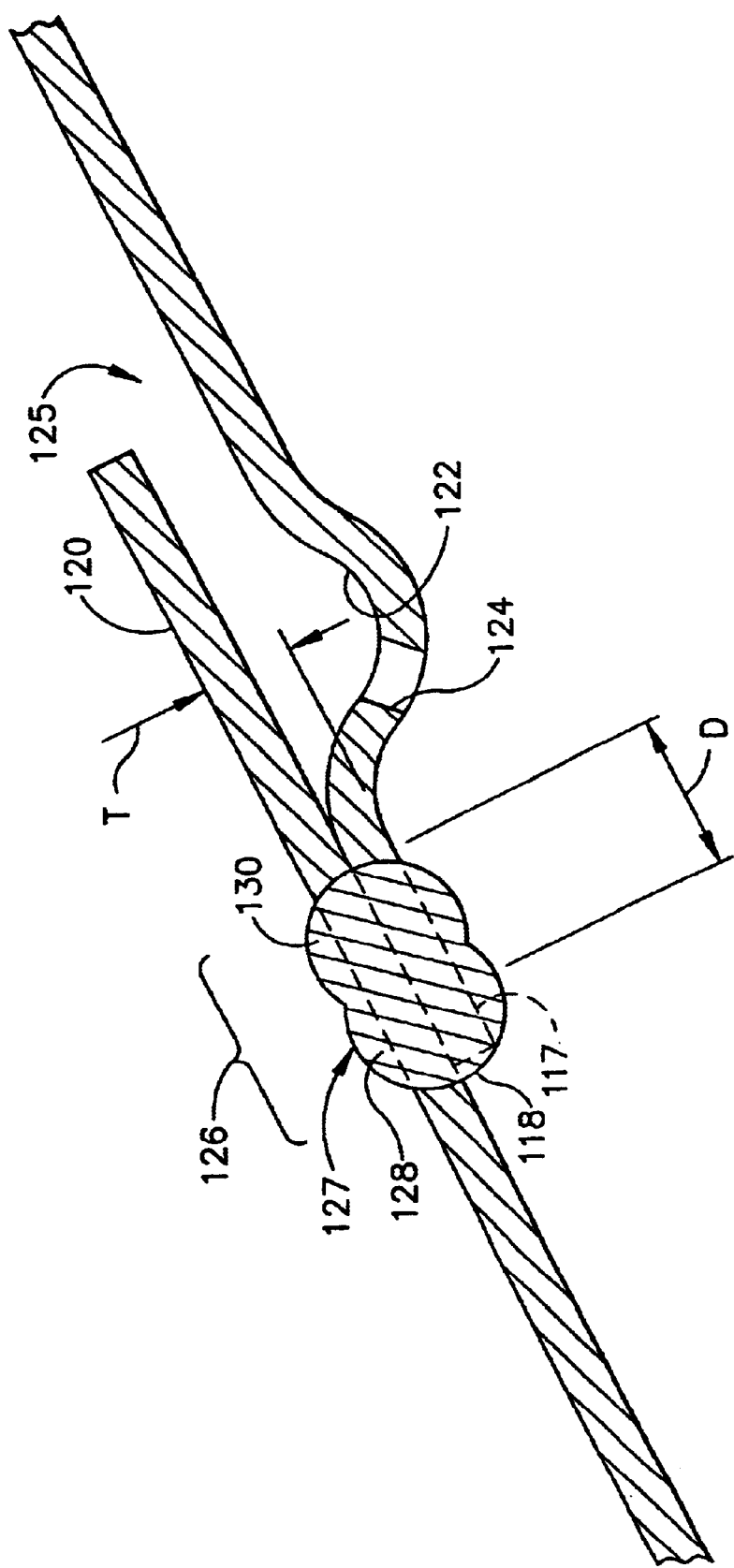
FIG. 4 is an enlarged view of a portion of FIG. 3 showing the band joint in more detail.

FIGS. 3 and 4 illustrate a combustor liner 114 constructed in accordance with the present invention. It should be noted that, except for the details of the joints described below, and the method of assembling the joints, the inner liner 114 is generally identical to the prior art inner liner 14 described above. Although the illustration is of an inner liner 114 the invention is equally applicable to outer liners as well. The inner liner 114 is built up from a plurality of bands 116, each of which has a forward end 118 and an aft end 120. The bands 116 have a ridge 122 formed therein which contains a plurality of cooling holes 124. When the liner is assembled, the ridges 122 cooperate with the aft end 120 of the adjacent band 116 to form a cooling slot 125. A weld joint area 126 extends around the circumference of the band 116 and is delimited in the axial direction by the overlapping areas of the adjacent bands 116. The band 116 has a flange 117 extending forward past ridge 122. A portion of the flange 117 is relatively flat as viewed in cross-section. This flat portion has a an axial length L2 that is substantially equal to the axial length of the weld joint area 126. In the exemplary embodiment the axial length L2 is about 40% of the axial length L1 of the braze joint 27 described above. A weld 127 comprising first and second weld beads 128 and 130 is disposed in the weld joint area 126. The weld beads 128 and 130 penetrate through both bands 116 at the weld joint area 126. the weld beads 128, 130 at least partially overlap each other in the axial direction, for example by about 10% of the weld bead diameter D (see FIG. 4). The weld bead diameter D and the axial length L2 of the flange 117 are chosen so that substantially all of the length L2 will be encompassed by the weld beads 128, 130. This prevents having voids within the weld joint area 126 and ensures that the surface areas of the bands 116 that are within the weld joint area 126 will be in uninterrupted contact, ensuring sufficient heat transfer from one band 116 to the other.

The axial length L2 of the weld joint area 126 may be made shorter than the brazed joint area axial length L1 because of the greater strength of the welded joint as compared to the brazed joint. The axial length L2 may of course be varied to suit a particular application. If the axial length L2 is too short the joint between the bands will not be able to sustain the expected shear loads during operation. On the other hand, excessive axial length requires additional processing and materials without providing an additional benefit. In the illustrated example the weld joint area axial length L2 is about 3 to 5 times the total thickness T of both bands 116 at the weld joint area 126.

Figure 5:
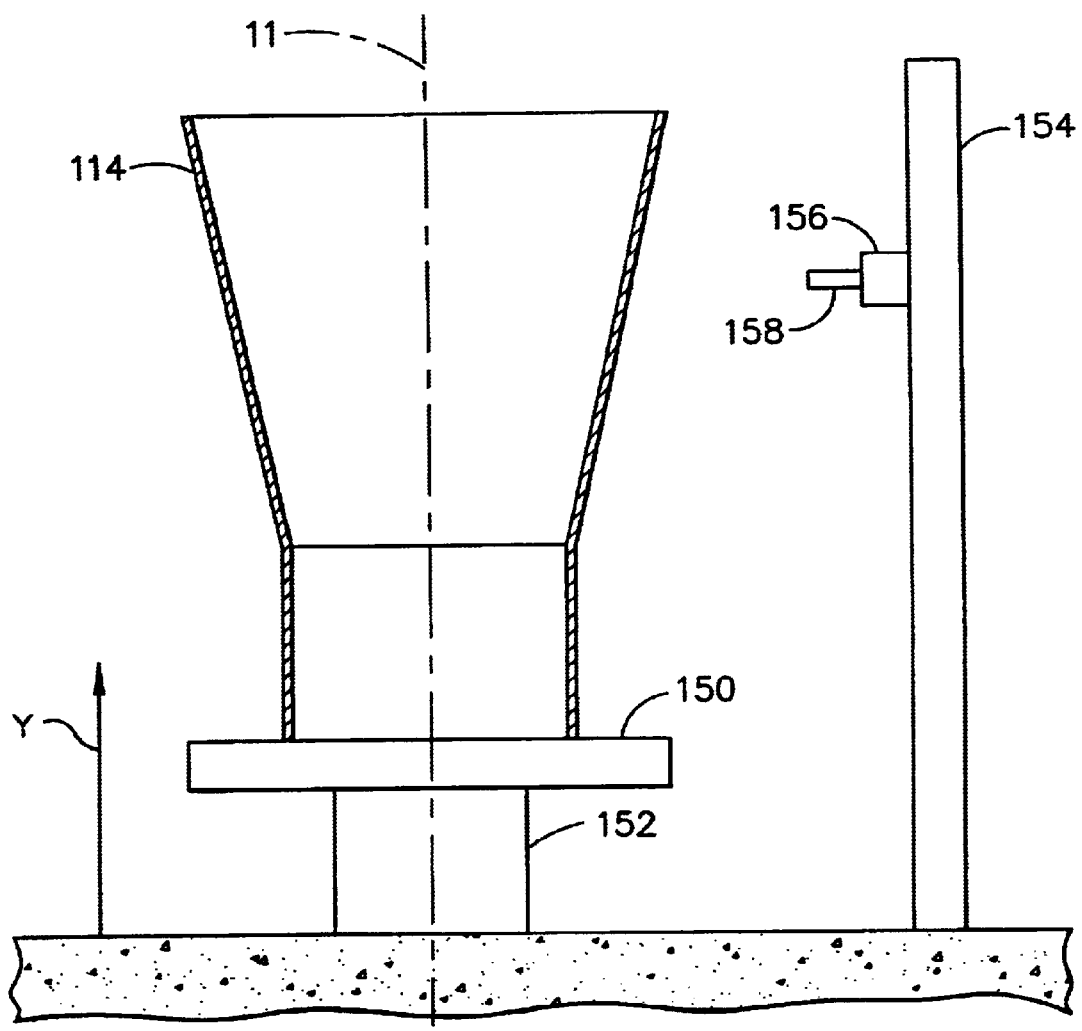
FIG. 5 is a side view of an exemplary laser welding apparatus and a representative combustor liner positioned therein.

The bands 116 are joined by a laser welding process. The laser welding process is especially suited to joining the bands 116, which have a thickness of only about 1.0 mm (0.04 in.) each. The laser welding process, unlike other welding processes, allows the bands 116 to be joined without overheating them or distorting them into an out-of-round condition. Initially, the bands 116 are temporarily held together by a plurality of tack welds in an known manner. Referring to FIG. 5, The stacked, tack welded bands 116 are then placed in a vertical position on a rotary table 150 having a rotating mechanism 152. The inner liner 114 is rotated at a predetermined speed. The rotation speed is chosen based on the part radius to give the desired linear weld speed, which is related to the other weld parameters described below. A laser apparatus 158 of a known type capable of generating and directing a laser beam, for example a Nd:YAG or $CO_2$ laser, is suspended from a support column 154 by a moveable carriage 156, and may be traversed along an axis parallel to the combustor's axis 11 as shown by arrow Y. The inner liner 114, rotary table 150, and the laser apparatus 158 may be placed in an inert gas atmosphere to prevent contamination of the weld joints. The laser apparatus 158 is aligned with the axial position of the first joint and the laser beam is energized. As the beam strikes the surface, it melts the band 116 in the area where it impinges, creating a first weld bead 128 which penetrates both bands 116, joining the bands 116 together as the inner liner 114 rotates.

The laser weld parameters are chosen to result in the full penetration weld described above. Suitable examples of weld parameters would include a Nd:YAG laser of about 500 to about 3000 Watts output power, operated continuously, with a weld speed of about 5 to about 1500 inches per minute, or an Nd:YAG laser pulsed at about 10 to about 60 Joules/pulse with a weld speed of about 3 to about 30 inches per minute. A $CO_2$ laser of about 1000 to about 5000 Watts output power could also be used, operated continuously, with a weld speed of about 50 to about 500 inches per minute. These parameters are intended as examples and may be varied to suit a particular application. Any type of laser weld equipment and parameters operable to produce full penetration welds may be used.

After the first weld bead 128 is created around the entire circumference of the weld joint area 126, the laser beam is de-energized and the laser apparatus 158 is then moved a small distance along the Y axis. The beam is again directed at the weld joint area 126 while the inner liner 114 is rotated. This forms a second weld bead 130 which penetrates both bands 116 in the joint area 126 and also overlaps the first weld bead 128 in the axial direction, as shown in FIG. 4. Together the overall axial length of the first and second weld beads 128 and 130 encompasses substantially all of the weld joint length L2. After completing a first joint, the laser beam directing apparatus 158 may then be indexed along the Y axis to the next joint and the welding process repeated until the entire inner liner 114 has been laser welded. When all of the joints are completed they are inspected in a conventional manner, for example by X-ray inspection.

The invention described herein provides an improved combustor liner and method for its assembly. The process described herein will be much less labor intensive relative to brazing of liners since the braze slurry application is eliminated, there is no furnace cycle time required and no second braze operation. The end result is a significant reduction in cost and cycle time to complete the liner joining process.

The foregoing has described a combustor liner having first and second annular bands which define an overlapping circumferential joint area, wherein a weld is disposed in the joint area encompassing substantially all of the axial length of the joint area; and a method for producing such a combustor liner. While specific embodiments of the present invention have been described, it will be apparent to those skilled in the art that various modifications thereto can be made without departing from the spirit and scope of the invention as defined in the appended claims.

What is claimed is:

1. A combustor liner comprising:
    a first annular band having forward and aft ends, said first annular band disposed about a central axis; and
    a second annular band having forward and aft ends, said second annular band disposed about said central axis and having a flange disposed in an overlapping relationship with said first annular band so as to define a circumferentially extending joint area; and
    a weld disposed in said joint area comprising a first circumferentially extending weld bead penetrating said first and second annular bands, and a second circumferentially extending weld bead penetrating said first and second annular bands and disposed adjacent to said first circumferentially extending weld bead, wherein at least a portion of said first and second weld beads overlap each other.

2. The combustor liner of claim 1 wherein said flange of said second annular band has a first length in an axial direction, and said weld has a second length in an axial direction, said second length being substantially equal to said first length.

3. The combustor liner of claim 1 further comprising additional annular bands disposed about said central axis, each of said additional annular bands being disposed in overlapping relationship with an adjacent annular band so as to create an additional circumferentially extending joint area, wherein a weld is disposed in each of said additional joint areas, each of said welds comprising first and second overlapping weld beads.

4. A combustor liner comprising:
 a first annular band having forward and aft ends and a ridge containing a plurality of cooling holes, said first annular band disposed about an axis;
 a second annular band having forward and aft ends and a ridge containing a plurality of cooling holes, said second annular band disposed about said axis and having a flange disposed in an overlapping relationship with said first annular band so as to define a circumferentially extending joint area; and
 a weld disposed in said joint area comprising a circumferentially extending weld bead penetrating said first and second annular bands, wherein said flange of said second annular band has a first length in an axial direction, and said weld has a second length in an axial direction, said second length being substantially equal to said first length.

5. The combustor liner of claim 4 further comprising additional annular bands disposed about said axis, each of said additional annular bands being disposed in overlapping relationship with an adjacent annular band so as to create additional circumferentially extending joint areas, wherein a weld is disposed in each of said additional joint areas, each of said welds comprising first and second overlapping weld beads.

* * * * *